United States Patent
Masnadi-Shirazi et al.

(10) Patent No.: US 11,064,294 B1
(45) Date of Patent: Jul. 13, 2021

(54) MULTIPLE-SOURCE TRACKING AND VOICE ACTIVITY DETECTIONS FOR PLANAR MICROPHONE ARRAYS

(71) Applicant: SYNAPTICS INCORPORATED, San Jose, CA (US)

(72) Inventors: Alireza Masnadi-Shirazi, Irvine, CA (US); Francesco Nesta, Aliso Viejo, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 0 days.

(21) Appl. No.: 16/740,297

(22) Filed: Jan. 10, 2020

(51) Int. Cl.
- H04R 3/00 (2006.01)
- H04R 1/40 (2006.01)
- H04R 29/00 (2006.01)
- G10L 25/78 (2013.01)

(52) U.S. Cl.
CPC ............. *H04R 3/005* (2013.01); *G10L 25/78* (2013.01); *H04R 1/406* (2013.01); *H04R 29/006* (2013.01)

(58) Field of Classification Search
CPC ...... H04R 3/005; H04R 1/406; H04R 29/006; G10L 25/78
See application file for complete search history.

(56) References Cited

U.S. PATENT DOCUMENTS

| | | | |
|---|---|---|---|
| 2016/0057549 A1* | 2/2016 | Marquis | H03G 3/344 381/315 |
| 2019/0385635 A1* | 12/2019 | Shahen Tov | G10L 25/21 |

\* cited by examiner

*Primary Examiner* — Regina N Holder
(74) *Attorney, Agent, or Firm* — Haynes and Boone, LLP

(57) ABSTRACT

Embodiments described herein provide a combined multi-source time difference of arrival (TDOA) tracking and voice activity detection (VAD) mechanism that is applicable for generic array geometries, e.g., a microphone array that lies on a plane. The combined multi-source TDOA tracking and VAD mechanism scans the azimuth and elevation angles of the microphone array in microphone pairs, based on which a planar locus of physically admissible TDOAs can be formed in the multi-dimensional TDOA space of multiple microphone pairs. In this way, the multi-dimensional TDOA tracking reduces the number of calculations that was usually involved in traditional TDOA by performing the TDOA search for each dimension separately.

20 Claims, 7 Drawing Sheets

MULTIPLE-SOURCE TRACKING AND VOICE ACTIVITY DETECTIONS FOR PLANAR MICROPHONE ARRAYS

TECHNICAL FIELD

The present disclosure, in accordance with one or more embodiments, relates generally to audio signal processing, and more particularly for example, to systems and methods for multiple source tracking and multi-stream voice activity detections for generic planar microphone arrays.

BACKGROUND

Smart speakers and other voice-controlled devices and appliances have gained popularity in recent years. Smart speakers often include an array of microphones for receiving audio inputs (e.g., verbal commands of a user) from an environment. When target audio (e.g., the verbal command) is detected in the audio inputs, the smart speaker may translate the detected target audio into one or more commands and perform different tasks based on the commands.

One challenge of these smart speakers is to efficiently and effectively isolate the target audio (e.g., the verbal command) from noise or other active speakers in the operating environment. For example, one or more speakers can be active in the presence of one or more noise sources. When the goal is to enhance a specific speaker, that speaker is called the target speaker while the rest of the speakers can be viewed as interference sources. Existing speech enhancement algorithms mostly exploit the spatial information of the sources using multiple input channels (microphones), such as the blind source separation (BSS) methods related to independent component analysis (ICA), and the spatial filtering or beamforming methods.

The BSS methods, however, were primarily designed for batch processing, which can often be undesirable or even inapplicable in real applications due to the large response delays. Spatial filtering or beamforming methods, on the other hand, often require the supervision under voice activity detection (VAD) as the cost function that is to be minimized, which can be overly dependent on the estimate of a covariance matrix pertaining to the noise/interference-only segments.

Therefore, there is a need for improved systems and methods for detecting and processing target audio signal(s) in a multi-stream audio environment.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, where showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
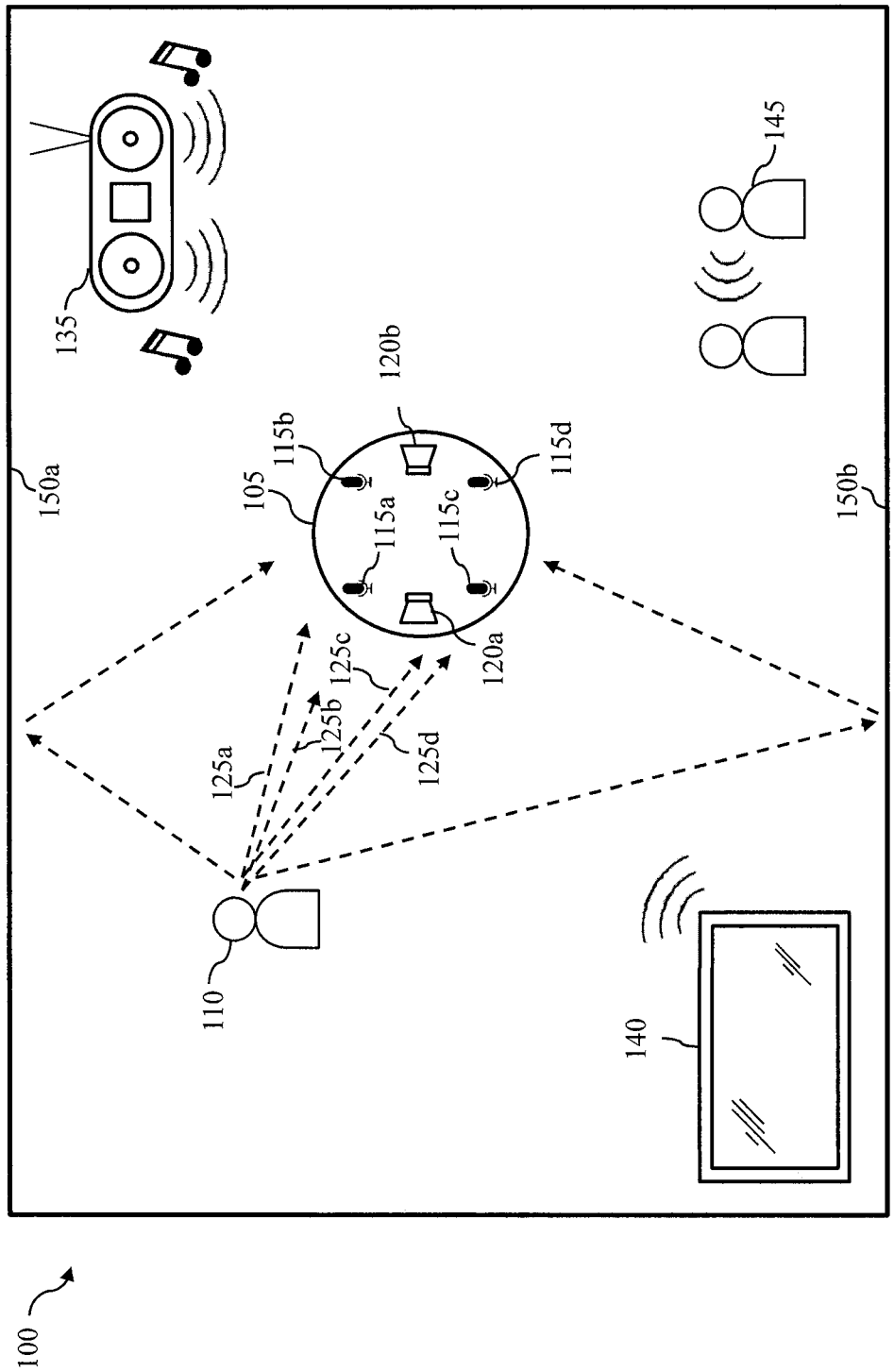
FIG. 1 illustrates an example operating environment for an audio processing device in accordance with one or more embodiments of the disclosure.

The present disclosure provides improved systems and methods for detecting and processing target audio signal(s) in a multi-stream audio environment.

Voice activity detection (VAD) may be used to supervise speech enhancement of target audio in a process that utilizes spatial information of the sources derived from multiple input channels. VAD may allow for the spatial statistics of interference/noise sources to be induced during silence periods of the desired speaker so that when the desired speaker becomes active, the effect of noise/interference can subsequently be nulled. For example, the VAD of each source can be inferred to track the spatial information of the sources in the form of Time Difference of Arrival (TDOA) or Direction of Arrival (DOA) by exploiting the history of the detections and constructing the VAD by determining when a detection appears in proximity of an existing track. This process is generally known as Measurement-to-Track (M2T) assignment. In this way, multiple VADs can be inferred for all the sources of interest.

Specifically, existing DOA methods usually construct a single steering vector for the entire array of microphones based on a closed form mapping of azimuth and elevation angles, which can be used to exploit the special geometry of linear or circular arrays. Such DOA methods cannot be extended to generic or arbitrary geometries of microphone arrays. In addition, these closed-form-mapping based DOA methods often require an extensive search in a multi-dimensional space. For arbitrary geometries, existing TDOA-based methods may be used, which may not restrict to a specific array geometry and may construct multiple steering vectors for each microphone pair to form a multi-dimensional TDOA vector (one dimension for each pair). However, these existing methods bear the risk of introducing TDOA ghosts formed by the cross intersection of the peaks from the spectrum of each TDOA pair. As a result, further post-processing involving the specific array geometry is often needed to remove TDOA ghosts.

In view of the need for multi-stream VAD that is not constrained by particular array geometries, embodiments described herein provide a combined multi-source TDOA tracking and VAD mechanism that is applicable for generic array geometries, e.g., a microphone array that lies on a plane. The combined multi-source TDOA tracking and VAD mechanism may reduce the number of calculations that was usually involved in traditional TDOA by performing the TDOA search for each dimension separately.

In some embodiments, a multi-dimensional TDOA method for generic array geometries that lie on a plane is employed, which avoids unwanted ghost TDOAs. In one embodiment, the Cartesian coordinates of the generically configured microphones are obtained, one of which may be selected as the reference microphone. The azimuth and elevation angles of the microphones may be scanned, based on which a planar locus of physically admissible TDOAs can be formed in the multi-dimensional TDOA space of multiple microphone pairs. In this way, the formed planar locus avoids the formation of ghost TDOAs, thus no further post-processing is needed to remove ghost TDOAs. Also, compared to a full DOA scan method, multi-dimensional TDOA methods disclosed herein reduce computational complexity by conducting the search in the pairwise TDOA domain pertaining to each dimension separately, rather than a search in a full multi-dimensional space.

FIG. 1 illustrates an example operating environment 100 in which an audio processing system may operate according to various embodiments of the disclosure. The operating environment 100 includes an audio processing device 105, a target audio source 110, and one or more noise sources 135-145. In the example illustrated in FIG. 1, the operating environment 100 is illustrated as a room, but it is contemplated that the operating environment may include other areas, such as an inside of a vehicle, an office conference room, rooms of a home, an outdoor stadium or an airport. In accordance with various embodiments of the disclosure, the audio processing device 105 may include two or more audio sensing components (e.g., microphones) 115a-115d and, optionally, one or more audio output components (e.g., speakers) 120a-120b.

The audio processing device 105 may be configured to sense sound via the audio sensing components 115a-115d and generate a multi-channel audio input signal, comprising two or more audio input signals. The audio processing device 105 may process the audio input signals using audio processing techniques disclosed herein to enhance the audio signal received from the target audio source 110. For example, the processed audio signals may be transmitted to other components within the audio processing device 105, such as a speech recognition engine or voice command processor, or to an external device. Thus, the audio processing device 105 may be a standalone device that processes audio signals, or a device that turns the processed audio signals into other signals (e.g., a command, an instruction, etc.) for interacting with or controlling an external device. In other embodiments, the audio processing device 105 may be a communications device, such as mobile phone or voice-over-IP (VoIP) enabled device, and the processed audio signals may be transmitted over a network to another device for output to a remote user. The communications device may also receive processed audio signals from a remote device and output the processed audio signals via the audio output components 120a-120b.

The target audio source 110 may be any source that produces sound detectable by the audio processing device 105. The target audio to be detected by the system may be defined based on criteria specified by user or system requirements. For example, the target audio may be defined as human speech, a sound made by a particular animal or a machine. In the illustrated example, the target audio is defined as human speech, and the target audio source 110 is a person. In addition to target audio source 110, the operating environment 100 may include one or more noise sources 135-145. In various embodiments, sound that is not target audio may be processed as noise. In the illustrated example, the noise sources 135-145 may include a loud speaker 135 playing music, a television 140 playing a television show, movie or sporting event, and background conversations between non-target speakers 145. It will be appreciated that different noise sources may be present in various operating environments.

It is noted that the target audio and noise may reach the audio sensing components 115a-115d of the audio processing device 105 from different directions and at different times. For example, the noise sources 135-145 may produce noise at different locations within the operating environment 100, and the target audio source (person) 110 may speak while moving between locations within the operating environment 100. Furthermore, the target audio and/or the noise may reflect off fixtures (e.g., walls) within the room 100. For example, consider the paths that the target audio may traverse from the target audio source 110 to reach each of the audio sensing components 115a-115d. As indicated by arrows 125a-125d, the target audio may directly travel from the target audio source 110 to the audio sensing components 115a-115d, respectively. Additionally, the target audio may reflect off the walls 150a and 150b, and reach the audio sensing components 115a-115d indirectly from the target audio source 110, as indicated by arrows 130a-130b. In various embodiments, the audio processing device 105 may use one or more audio processing techniques to estimate and apply a room impulse response to further enhance the target audio and suppress noise.

Figure 2:
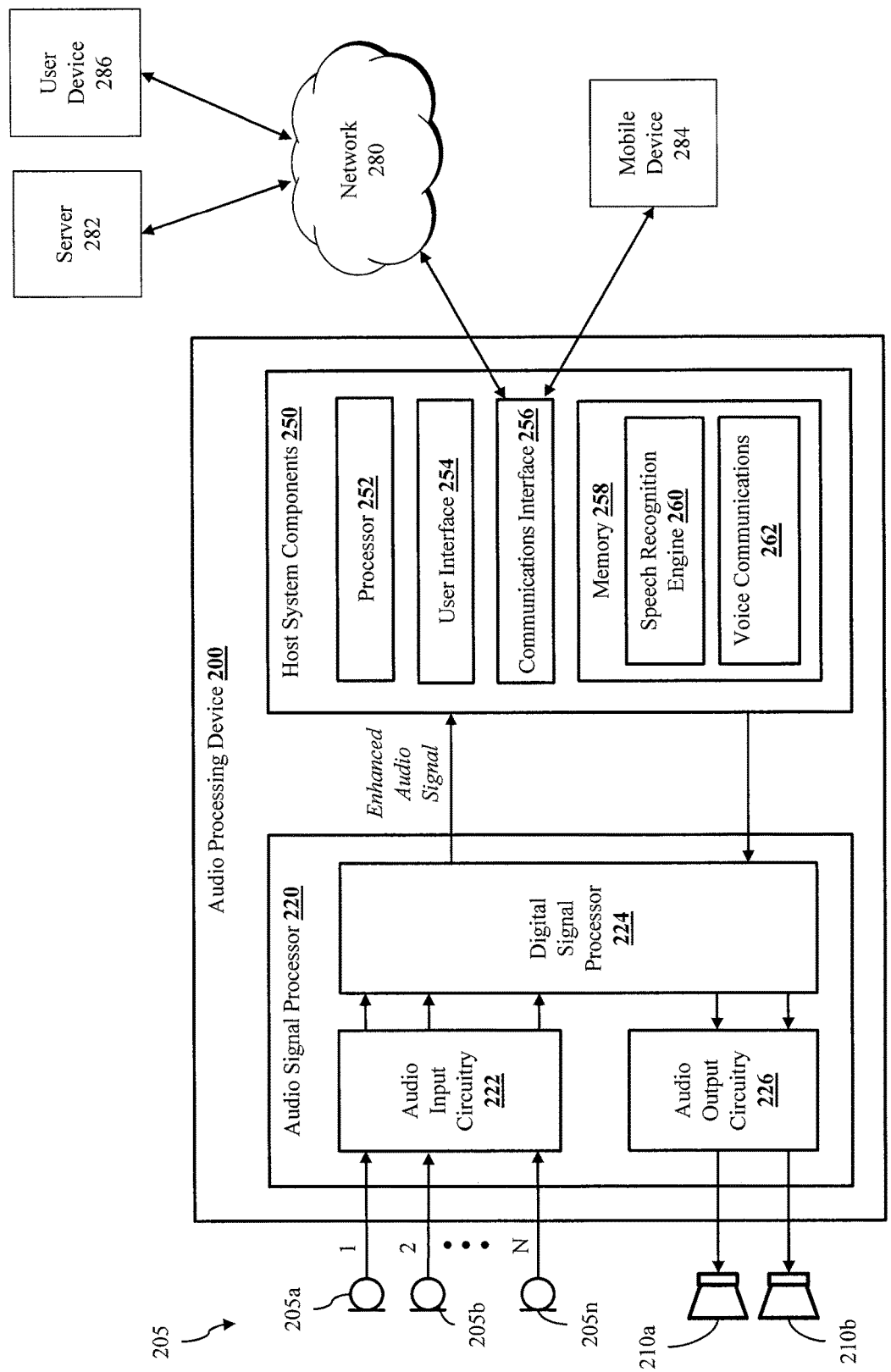
FIG. 2 is a block diagram of an example audio processing device in accordance with one or more embodiments of the disclosure.

FIG. 2 illustrates an example audio processing device 200 according to various embodiments of the disclosure. In some embodiments, the audio processing device 200 may be implemented as the audio processing device 105 of FIG. 1. The audio processing device 200 includes an audio sensor array 205, an audio signal processor 220 and host system components 250.

The audio sensor array 205 comprises two or more sensors, each of which may be implemented as a transducer that converts audio inputs in the form of sound waves into an audio signal. In the illustrated environment, the audio sensor array 205 comprises a plurality of microphones 205a-205n, each generating an audio input signal which is provided to the audio input circuitry 222 of the audio signal processor 220. In one embodiment, the audio sensor array 205 generates a multichannel audio signal, with each channel corresponding to an audio input signal from one of the microphones 205a-n.

The audio signal processor 220 includes the audio input circuitry 222, a digital signal processor 224 and optional audio output circuitry 226. In various embodiments the audio signal processor 220 may be implemented as an integrated circuit comprising analog circuitry, digital circuitry and the digital signal processor 224, which is operable to execute program instructions stored in firmware. The audio input circuitry 222, for example, may include an interface to the audio sensor array 205, anti-aliasing filters, analog-to-digital converter circuitry, echo cancellation circuitry, and other audio processing circuitry and components. The digital signal processor 224 is operable to process a multichannel digital audio signal to generate an enhanced audio signal, which is output to one or more host system components 250. In various embodiments, the digital signal processor 224 may be operable to perform echo cancellation, noise cancellation, target signal enhancement, post-filtering, and other audio signal processing functions.

The optional audio output circuitry 226 processes audio signals received from the digital signal processor 224 for output to at least one speaker, such as speakers 210a and 210b. In various embodiments, the audio output circuitry 226 may include a digital-to-analog converter that converts one or more digital audio signals to analog and one or more amplifiers for driving the speakers 210a-210b.

The audio processing device 200 may be implemented as any device operable to receive and enhance target audio data, such as, for example, a mobile phone, smart speaker, tablet, laptop computer, desktop computer, voice controlled appliance, or automobile. The host system components 250 may comprise various hardware and software components for operating the audio processing device 200. In the illustrated embodiment, the host system components 250 include a processor 252, user interface components 254, a communications interface 256 for communicating with external devices and networks, such as network 280 (e.g., the Internet, the cloud, a local area network, or a cellular network) and mobile device 284, and a memory 258.

The processor 252 and digital signal processor 224 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The host system components 250 are configured to interface and communicate with the audio signal processor 220 and the other host system components 250, such as through a bus or other electronic communications interface.

It will be appreciated that although the audio signal processor 220 and the host system components 250 are shown as incorporating a combination of hardware components, circuitry and software, in some embodiments, at least some or all of the functionalities that the hardware components and circuitries are operable to perform may be implemented as software modules being executed by the processor 252 and/or digital signal processor 224 in response to software instructions and/or configuration data, stored in the memory 258 or firmware of the digital signal processor 224.

The memory 258 may be implemented as one or more memory devices operable to store data and information, including audio data and program instructions. Memory 258 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory.

The processor 252 may be operable to execute software instructions stored in the memory 258. In various embodiments, a speech recognition engine 260 is operable to process the enhanced audio signal received from the audio signal processor 220, including identifying and executing voice commands. Voice communications components 262 may be operable to facilitate voice communications with one or more external devices such as a mobile device 284 or user device 286, such as through a voice call over a mobile or cellular telephone network or a VoIP call over an IP network. In various embodiments, voice communications include transmission of the enhanced audio signal to an external communications device.

The user interface components 254 may include a display, a touchpad display, a keypad, one or more buttons and/or other input/output components operable to enable a user to directly interact with the audio processing device 200.

The communications interface 256 facilitates communication between the audio processing device 200 and external devices. For example, the communications interface 256 may enable Wi-Fi (e.g., 802.11) or Bluetooth connections between the audio processing device 200 and one or more local devices, such as mobile device 284, or a wireless router providing network access to a remote server 282, such as through the network 280. In various embodiments, the communications interface 256 may include other wired and wireless communications components facilitating direct or indirect communications between the audio processing device 200 and one or more other devices.

Figure 3:
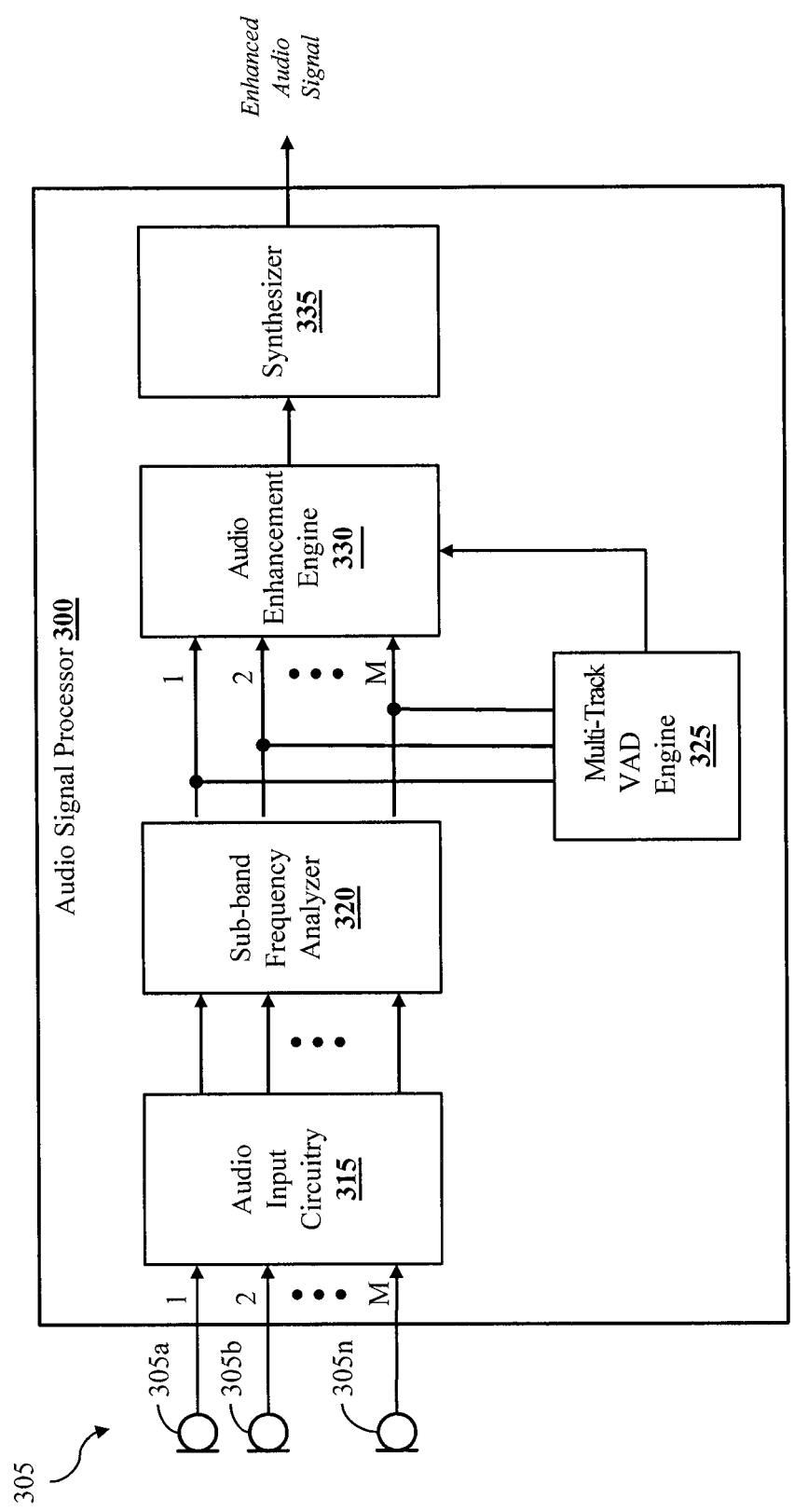
FIG. 3 is a block diagram of example audio signal processor for multi-track audio enhancement in accordance with one or more embodiments of the disclosure.

FIG. 3 illustrates an example audio signal processor 300 according to various embodiments of the disclosure. In some embodiments, the audio signal processor 300 is embodied as one or more integrated circuits including analog and digital circuitry and firmware logic implemented by a digital signal processor, such as audio signal processor 220 of FIG. 2. As illustrated, the audio signal processor 300 includes audio input circuitry 315, a sub-band frequency analyzer 320, a multi-track VAD engine 325, an audio enhancement engine 330, and a synthesizer 335.

The audio signal processor 300 receives a multi-channel audio input from a plurality of audio sensors, such as a sensor array 305 comprising at least two audio sensors 305a-n. The audio sensors 305a-305n may include microphones that are integrated with an audio processing device, such as the audio processing device 200 of FIG. 2, or external components connected thereto. The arrangement of the audio sensors 305a-305n may be known or unknown to the audio signal processor 300 according to various embodiments of the disclosure.

The audio signals may be processed initially by the audio input circuitry 315, which may include anti-aliasing filters, analog to digital converters, and/or other audio input circuitry. In various embodiments, the audio input circuitry 315 outputs a digital, multichannel, time-domain audio signal, where M is the number of sensor (e.g., microphone) inputs. The multichannel audio signal is input to the sub-band frequency analyzer 320, which partitions the multichannel audio signal into successive frames and decomposes each frame of each channel into a plurality of frequency subbands. In various embodiments, the sub-band frequency analyzer 320 includes a Fourier transform process and outputs a plurality of frequency bins. The decomposed audio signals are then provided to the multi-track VAD engine 325 and the audio enhancement engine 330.

The multi-track VAD engine 325 is operable to analyze the frames of one or more of the audio tracks and generate VAD outputs indicating whether a target audio activity is present in the current frame. As discussed above, target audio may be any audio to be identified by the audio system. When the target audio is human speech, the multi-track VAD engine 325 may be implemented specifically for detecting voice activities. In various embodiments, the multi-track VAD engine 325 is operable to receive a frame of audio data and generate a VAD indication output for each audio track regarding the presence or absence of the target audio on the respective audio track corresponding to the frame of audio data. Detailed components and operations of the multi-track VAD engine 325 is further illustrated in relation to 400 in FIG. 4.

The audio enhancement engine 330 receives the sub-band frames from the sub-band frequency analyzer 320 and the VAD indications from the multi-track VAD engine 325. In accordance with various embodiments of the disclosure, the audio enhancement engine 330 is configured to process the sub-band frames based on the received multi-track VAD indications to enhance the multi-track audio signals. For example, the audio enhancement engine 330 may enhance the portion of the audio signal determined to be from the direction of the target audio sources and suppress the other portions of the audio signal which are determined to be noise.

After enhancing the target audio signal, the audio enhancement engine 330 may pass the processed audio signal to the synthesizer 335. In various embodiments, the synthesizer 335 reconstructs one or more of the multichannel audio signals on a frame-by-frame basis by combining the sub-bands to form an enhanced time-domain audio signal. The enhanced audio signal may then be transformed back to the time domain and sent to a system component or external device for further processing.

Figure 4:
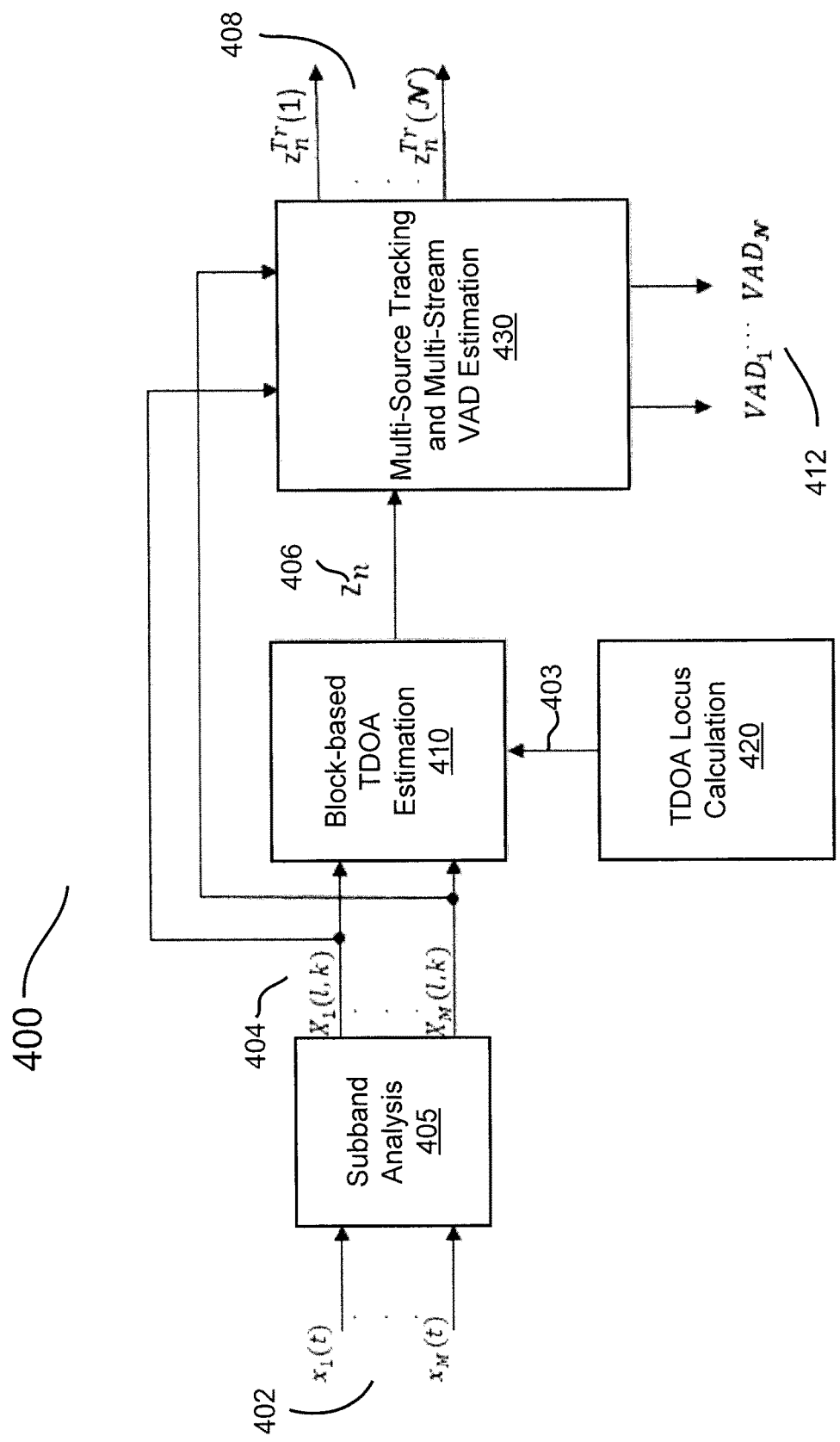
FIG. 4 is a block diagram of an example multi-track activity detection engine for processing multiple audio signals from a generic microphone array according to various embodiments of the disclosure.

FIG. 4 illustrates an example multi-track VAD engine 400 for processing multiple audio signals from a generic microphone array according to various embodiments of the disclosure. The multi-track VAD engine 400 may be implemented as a combination of digital circuitry and logic performed by a digital signal processor. In some embodiments, the multi-track VAD engine 400 may be installed in an audio signal processor such as 300 in FIG. 3. The multi-track VAD engine 400 may provide further structural and functional details to the multi-track VAD engine 325 in FIG. 3.

According to various embodiments of the disclosure, the multi-track VAD engine 400 includes a subband analysis module 405, a block-based TDOA estimation module 410, a TDOA locus calculation module 420 and a multi-source tracking and multi-stream VAD estimation module 430.

The subband analysis module 405 receives multiple audio signals 402, denoted by $x_m(t)$, m=1, . . . , M, the sampled time domain audio signal recorded at the $m^{th}$ microphone for a total of M microphones (e.g., similar to audio sensors 305a-n in FIG. 3). The audio signals $x_m(t)$, m=1, . . . , M, may be received via the audio input circuitry 315 in FIG. 3.

The subband analysis module 405 is configured to obtain and transform the audio signals 402 to a time-frequency domain representation 404, denoted as $X_m(l,k)$ corresponding to the original time-domain audio signal $x_m(t)$, where l indicates the subband time index and k indicates the frequency band index. For example, the subband analysis module 405 may be similar to the sub-band frequency analyzer 320 in FIG. 3, which performs Fourier transform to convert input time-domain audio signals to frequency domain representations. The subband analysis module 405 may then send the generated time-frequency domain representations 404 to the block-based TDOA estimation module 410 and the multi-source tracking and multi-stream VAD estimation module 430.

The TDOA locus calculation module 420 is configured to scan a generic microphone array (e.g., audio sensors 305a-n that form a generic array geometry). For example, for a given arbitrary microphone array geometry on a plane, a locus of permissible TDOA locations is computed once at system boot-up. This locus of points can avoid the ghost formations.

Figure 5A:
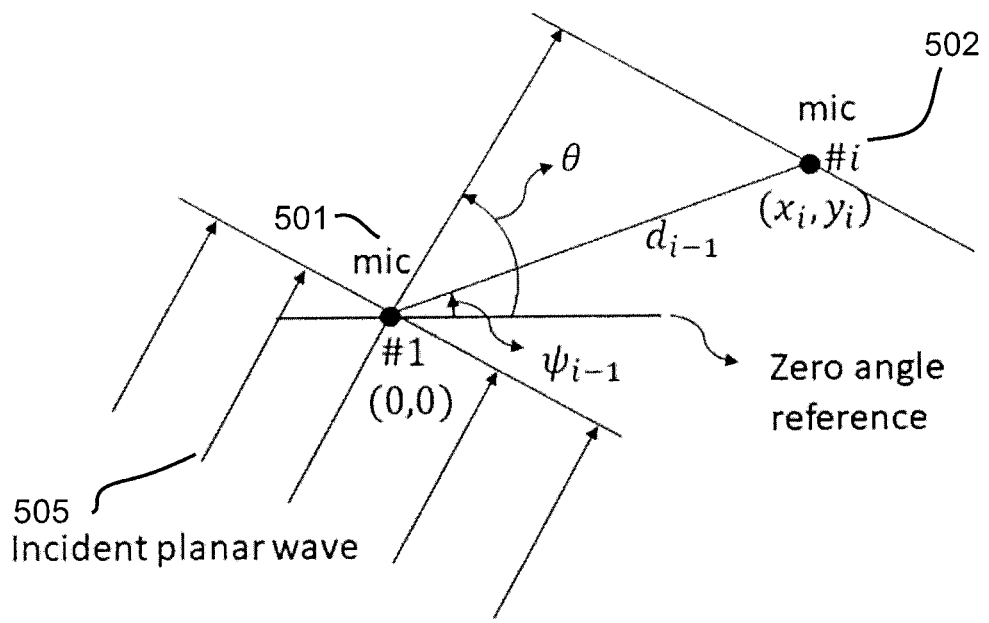
FIG. 5A is a diagram illustrating example geometry of a microphone pair according to one or more embodiments of the disclosure.

For an array of M microphones, the first microphone may be selected as the reference microphone, which in turn gives M−1 microphone pairs all with respect to the first microphone. For example, FIG. 5A illustrates an example microphone pair. The microphone pair, indexed as the i−1a pair, includes microphone i 502 and reference microphone 1 501 for an incident ray 505 with azimuth angle θ and elevation angle of zero emitted from a distant source (assuming a far-field model). The distance between the microphone pair of 501 and 502 as well as the angle between the two microphones are denoted as $d_{i-1}$ and $y_{i-1}$, respectively, which can be computed given the Cartesian coordinates of the $i^{th}$ microphone 502. For the general case when the incident ray 505 is angled at azimuth θ and elevation ϕ, the TDOA of the (i−1)th microphone pair can be computed as $$\tau_{i-1}(\theta, \phi) = \frac{d_{i-1}}{c} \cos(\theta - \psi_{i-1})\cos\phi \qquad (1)$$

where c is the propagation velocity.

After scanning different elevation and azimuth angles, the TDOA locus calculation module 420 may construct a mesh of permissible TDOAs. When all the M microphones lie on a plane, the resulting TDOA locus ($\tau_1(\theta,\phi), \ldots, \tau_p(\theta,\phi), \ldots, \tau_{M-1}(\theta,\phi)$ for all scans of θ and ϕ) also lies on a plane in the (M−1) dimensional space. Different layouts of the M microphones may result in different planes in the (M−1) dimensional space.

Figure 5B:
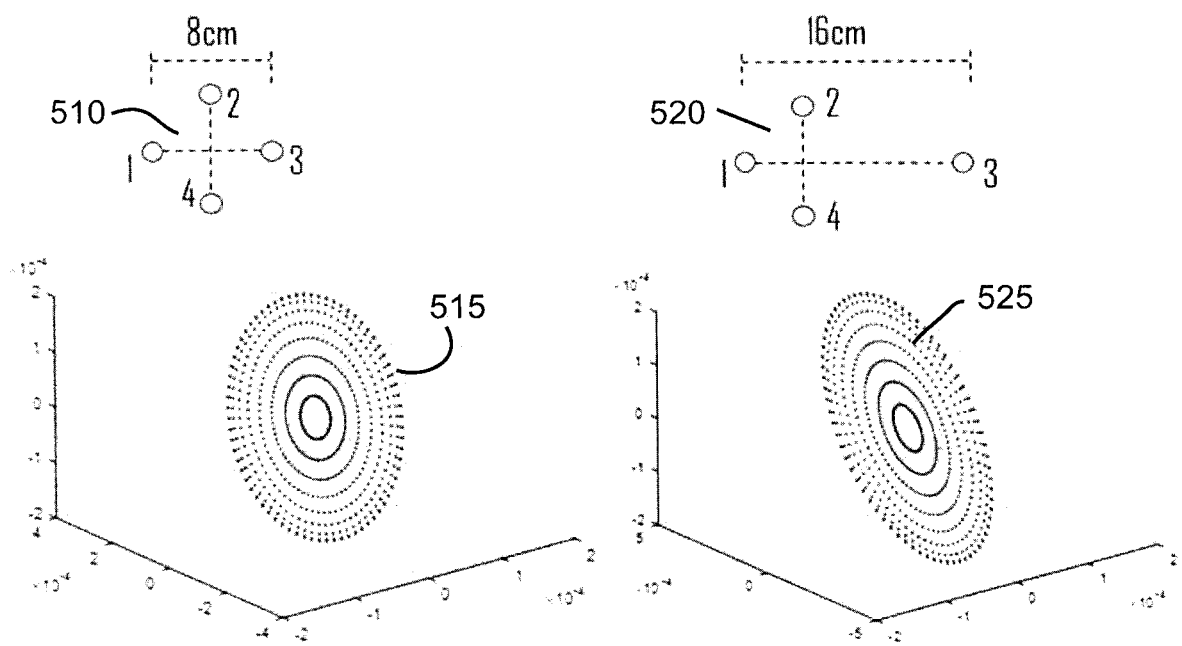
FIG. 5B is a diagram illustrating example meshes of time difference of arrival (TDOA) locus information in a multi-dimensional space corresponding to different microphone array geometries according to one or more embodiments of the disclosure.

For example, FIG. 5B illustrates two different example microphone layouts along with their respective TDOA meshes. A set of M=4 microphones are shown at 510, where the distance between the first and the third microphone is 8 cm and the resulting mesh of permissible TDOA is in the M−1=3-dimensional space as shown at 515. When the distance between the first and the third microphone increases to 16 cm as shown at 520, the resulting mesh of permissible TDOA is shown at 525.

Referring back to FIG. 4, the TDOA locus calculation module 420 may then send the (M−1)-dimensional TDOAs 403 to the block-based TDOA estimation module 410. The block-based TDOA estimation module 410 receives the time-frequency domain representations 404 of the multi-source audios and the TDOAs 403, based on which TDOA estimation module 410 extracts the TDOA information of the source microphones (e.g., audio sensors 305a-n shown in FIG. 3) using the data obtained from consecutive frames.

In one embodiment, the block-based TDOA estimation module 410 employs a steered minimum variance (STMV) beamformer to obtain TDOA information from the time-frequency domain representations 404 of the multi-source audios. Specifically, the block-based TDOA estimation module 410 may select a microphone as a reference microphone, and then designate a total of M−1 microphone pairs by pairing the remaining M−1 microphones with the reference microphone. The microphone pairs are indexed by p=1, . . . , M−1.

For example, the first microphone may be selected as the reference microphone, and accordingly, $X_1(l,k)$ denotes the time-frequency representation of the audio from the reference microphone. For the $p^{th}$ pair of microphones, the block-based TDOA estimation module 410 computes a frequency representation of the pth pair in the matrix form as $X_p(k,l)=[X_1(l,k) \ X_{p+1}(l,k)]$ where $(\ )^T$ represents the transpose. The block-based TDOA estimation module 410 then computes the covariance matrix of the pth input signal pairs for every frequency band k:

$$R_p(k) = \Sigma_l X_p(k,l) X_p(k,l)^H \qquad (2)$$

where $(\ )^H$ represents the Hermitian transpose.

In some implementations, the summation in computing $R_p(k)$ is implemented over a block of certain number of consecutive frames. The index of the block is neglected here for brevity.

The block-based TDOA estimation module 410 may then construct a steering matrix for each pair and frequency band as follows:

$$T_k(\tau_p) = \text{diag}([1 \, e^{-j2\pi f_k \tau_p}]^T) \quad (3)$$

where $\tau_p$ is the TDOA for the pth pair obtained from the TDOA locus calculation module 420 after different scans of $\theta$ and $\phi$ (neglected for brevity); $f_k$ is the frequency at band k; and diag([a, b]) denotes a 2×2 diagonal matrix with diagonal elements a and b.

For each microphone pair p, the block-based TDOA estimation module 410 constructs the directional covariance matrix that is coherently aligned across all frequency bands by:

$$C_p(\tau_p) = \Sigma_k T_k(\tau_p) R_p(k) T_k(\tau_p)^H \quad (4)$$

The computation of the directional covariance matrix $C_p(\tau_p)$ is repeated over all microphone pairs p and all scans of azimuth/elevation $(\theta,\phi)$ for $\tau_p$. In order to reduce computations over all scans, the TDOA space of each dimension p corresponding to the pth microphone pair is linearly quantized to q segments. At the beginning of the processing (at system boot-up), the TDOA locus points $(\tau_1, \ldots, \tau_p, \ldots, \tau_{M-1})$ obtained from scanning each azimuth and elevation angles $(\theta,\phi)$ is mapped to the closest quantized points for each dimension. For each azimuth/elevation $(\theta,\phi)$, the mapping of $(\theta,\phi) \rightarrow (\text{ind}_1(\theta,\phi), \ldots, \text{ind}_{M-1}(\theta,\phi))$ is saved in memory, where $1 \leq \text{ind}_p(\theta,\phi) \leq q$ is the quantized TDOA index of dimension p pertaining to scanning angles $\theta$ and $\phi$.

For example, if there exists M=4 microphones and the azimuth and elevation scans are $\Theta=0°:5:355°$, $\Phi=0°:10:80°$, respectively. The number of distinct computations of $C_p(\tau_p)$ that need to be performed is length($\Theta$)×length($\Phi$)×(M−1)= 72×9×3=1944. When TDOA locus points $(\tau_1, \ldots, \tau_p, \ldots, \tau_{M-1})$ are quantized, not all calculations need to be carried out as some of the TDOA dimensions may be quantized to the same segment among the q quantized segments. Therefore, if for example q=50, the maximum number of distinct computations needed to compute $C_p(\tau_p)$ is reduced to q×(M−1)=50×3=150. The pseudo-code to carry out the computation of $C_p(\tau_p)$ with TDOA quantization may be demonstrated in Algorithm 1 as follows:

---
Algorithm 1 Calculating $C_p(\tau_p)$ using TDOA quantizations

```
R_avg = zeros(2,2,length(Θ),length(Φ),M − 1)
for k > 0 do
    V = zeros(2,2,q,M − 1)
    for p = 1 : M − 1 do
        for i = 1 : length(Θ) do
            for j = 1 : length(Φ) do
                if V (:,:,ind_p(Θ(i),Φ(j)),p) = 0 then
                    T_k = diag([1 e^{-j2πf_k τ_p(Θ(i),Φ(j))}]^T)
                    V(:,:,ind_p(Θ(i),Φ(j)),p) = T_k R_p (k) T_k^H
                end if
                R_avg(:,:,i,j,p) = R_avg(:,:,i,j,p) + V (:,:,ind_p(Θ(i),Φ(j)),p)
            end for
        end for
    end for
end for
```
---

Next, for each pair p, the direction that minimizes beam power subject to a distortionless criteria with its equivalent pseudo-likelihood solution is computed as:

$$\mathcal{L}_p^{STMV}(\tau_p) = \frac{1}{1^T C_p^{-1}(\tau_p) 1} \quad (5)$$

where $1=[1 \, 1]^T$. The block-based TDOA estimation module 410 may then compute the STMV joint pseudo-likelihood for all M−1 pairs of microphones as:

$$\mathcal{L}^{STMV}\left(\tau_1, \ldots, \tau_{M-1}\right) = \prod_{p=1}^{M-1} \mathcal{L}_p^{STMV}(\tau_p) \quad (6)$$

The azimuth and elevation that yields the maximum STMV joint pseudo-likelihood of all M−1 pairs is then identified, denoted by $$\theta^*, \phi^* = \text{argmax}_{\theta,\phi} \mathcal{L}^{STMV}(\tau_1, \ldots, \tau_{M-1}) \quad (7)$$

The azimuth and elevation pair $\theta^*, \phi^*$ may then be used for multi-source tracking and multi-stream VAD estimation. One possible solution may include tracking the angles between the two microphones of each microphone pair directly. However, due to the wrap-around effect of azimuth in 360 degrees, if tracking is done directly on the angles between paired microphones, track loss may occur when a microphone source crosses 0° towards 360° and vice versa. Therefore, in order to avoid such confusion, detection z is computed based on the angles between paired microphones in a circular manner using a polar transformation as follows:

$$z = \alpha_{scale}[\cos\theta^*\cos\theta^*\sin\theta^*\cos\theta^*]^T \quad (8)$$

where $\alpha_{scale} > 1$ is a scaling constant that may expand the measurement space allowing the tracking to be done with parameters pertaining to meaningful concepts like angles.

The block-based TDOA estimation module 410 then sends the computed detection z to the multi-source tracking and multi-stream VAD estimation module 430. If an $\mathcal{N}$ maximum number of tracks exist, the TDOAs obtained from the block-based TDOA estimation module 410 are to be tracked by updating the track obtained from a previous step in a recursive manner. Specifically, if the detection obtained at block (time-step) n−1 is denoted by $z_{n-1}$ and up until then there existed $t_{n-1}$ tracks, for a new detection $z_n$ 406 emerging at time-step n, the multi-source tracking and multi-stream VAD estimation module 430 processes the new detection $z_n$ based on the gate of existing tracks as follows:

If $z_n$ falls into the gate of only one of the previous $t_{n-1}$ tracks, the particular track is updated to incorporate detection $z_n$.

If $z_n$ falls into the overlapping gates of multiple previous $t_{n-1}$ tracks, then the track that is closest to detection $z_n$ is updated to incorporate detection $z_n$.

If $z_n$ does not fall into the gate of any of the previous $t_{n-1}$ tracks, and the maximum number of tracks $\mathcal{N}$ is not reached (e. g., $t_{n-1} < \mathcal{N}$), then a new track is initiated to incorporate detection $z_n$ and the number of existing tracks is updated at time-step n, e.g., $t_n = t_{n-1} + 1$.

If $z_n$ does not fall into the gate of any of the previous $t_{n-1}$ tracks and the maximum number of tracks $\mathcal{N}$ has been reached (e.g., $t_{n-1} = \mathcal{N}$), then the track with the lowest power among the existing $\mathcal{N}$ tracks is killed, and is replaced with a new track to incorporate detection $z_n$.

For all the other tracks that were not updated, initiated or replaced (as in previous steps), then these tracks are updated with the same mean value, but the variance of each respective track is increased to account for uncertainty, e.g., based on a random walk model. The power of each respective track is also decayed so that future emerging source has chance to be initiated. In this way, the tracking results 408 incorporating the up-to-date detections 406 at time-step n can be output from the module 430, denoted by $z_n^{Tr}(1), \ldots z_n^{Tr}(\mathcal{N})$.

When all the audio tracks have been updated, the module 430 generates multi-stream VADs 412 using the nearest neighbor M2T assignment. Specifically, at time-step n, the M2T assignment may be carried out by assigning a 1 to the track that is closest to detection $z_n$ and 0 to the other tracks. In some implementations, a hangover may be applied for the VADs to have an intermediate value, e.g., −1, etc., before they are assigned completely to zero after being 1 in the previous time-step. In this way, the multi-stream VADs 412, denoted by $VAD_1 \ldots, VAD \mathcal{N}$, each representing whether any voice activity detection is found in the respective track, are output from the module 430 for audio enhancement, e.g., to the audio enhancement engine 330 in FIG. 3.

Figure 6:
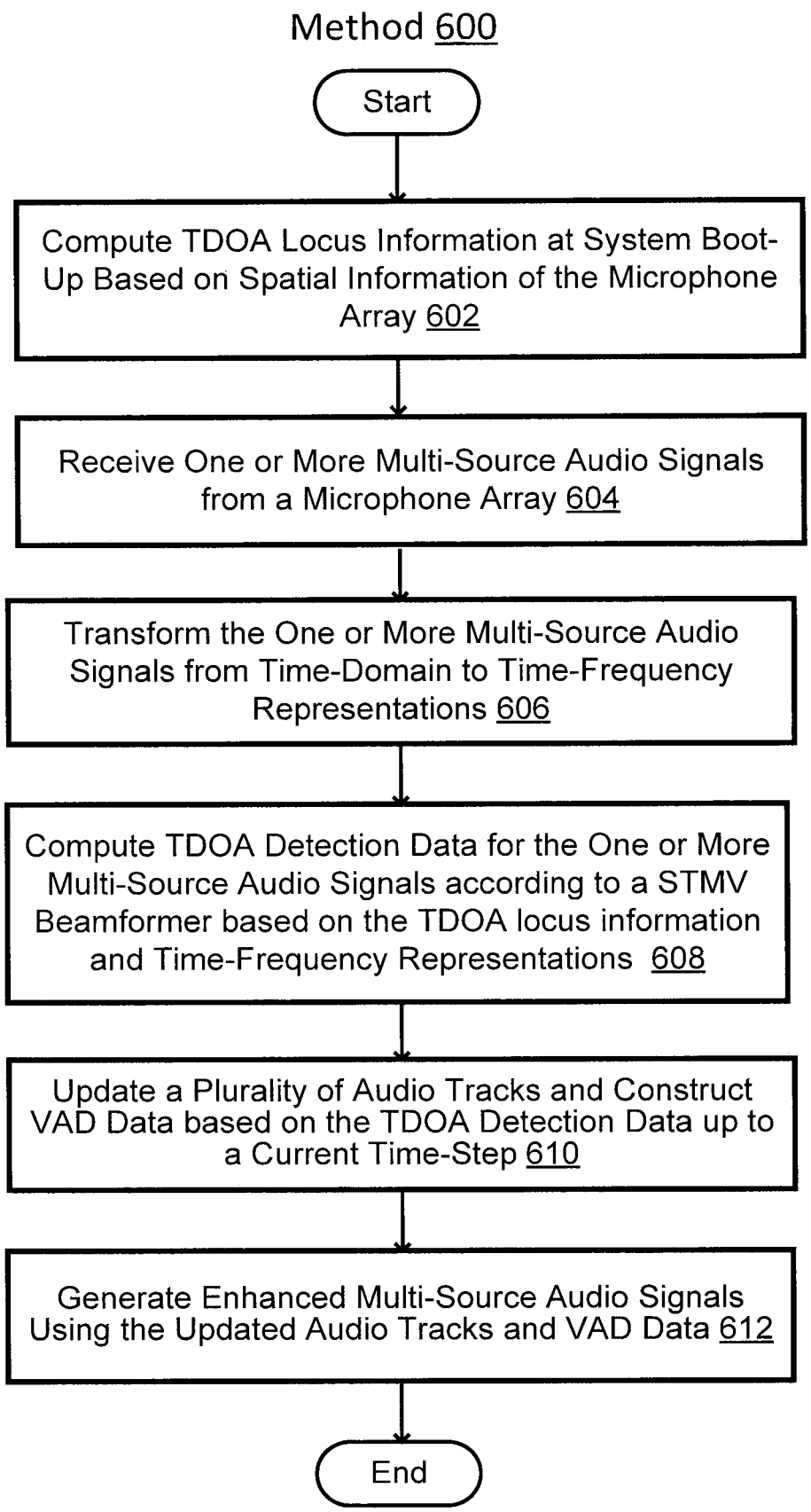
FIG. 6 is a logic flow diagram of an example method for enhancing multi-source audio signals by multi-source tracking and activity detection according to various embodiments of the disclosure.

FIG. 6 illustrates an example method 600 for enhancing multi-source audio signals by multi-source tracking and VAD according to various embodiments of the disclosure. In some embodiments, the method 600 may be performed by one or more components in the audio signal processor 300, and/or one or more components of the multi-track VAD engine 400.

Method 600 starts with step 602, at which the TDOA locus information may be computed based on spatial information of a microphone array. For example, the TDOA locus information may be computed once at system boot-up by scanning the microphone array with incident rays of varying azimuth and elevation angles. The computation may be performed with reduced complexity in a multi-dimensional space constructed by pairing the microphones from the microphone array, as further described in relation to FIG. 7.

Figure 7:
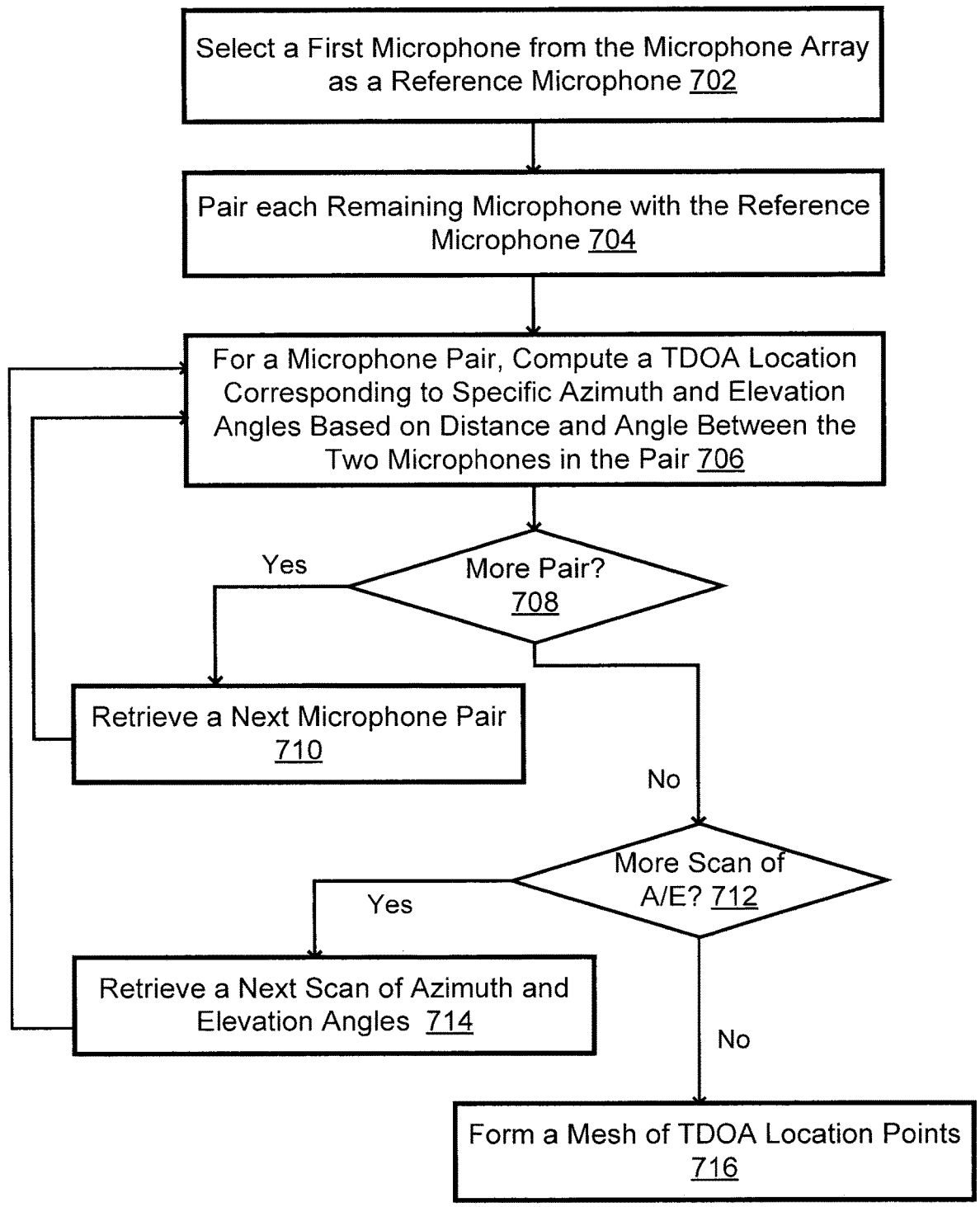
FIG. 7 is a logic flow diagram of an example process for computing TDOA locus information in the multi-dimensional space using microphone pairs according to various embodiments of the disclosure.

Referring to FIG. 7 which provides further detailed steps for step 602, at step 702, a first microphone may be selected from the microphone array as a reference microphone. At step 704, each remaining microphone from the microphone array may be paired with the reference microphone. At step 706, for each microphone pair, a TDOA location corresponding to a specific azimuth angle and a specific elevation angle of an incident ray may be computed based on a distance and an angle between two microphones in the respective pair, e.g., according to Eq. (1) described in relation to FIG. 4. An example microphone pair with a specific azimuth angle and a specific elevation angle of an incident ray is also shown in FIG. 5A.

At step 708, if there are more microphone pairs to be processed, the method retrieves the next microphone pair at step 710 and repeats at step 706 until TDOA locations for all microphone pairs have been computed.

At step 712, if there is more scan of the azimuth and elevation angles, the method retrieves the next scan of azimuth and elevation angles at step 714 and repeats at step 706, until TDOA locations for all scans of azimuth and elevation angles are computed.

At step 712, when no more scan of azimuth and elevation angles is to be processed, e.g., the TDOA locations have been computed for all microphone pairs over all scans of azimuth and elevation angles, a mesh of TDOA location points can be formed at step 716. Example meshes of TDOA location points corresponding to different geometries of the microphone arrays are shown in FIG. 5B.

Referring back to FIG. 6, upon computing the TDOA locus information at system boot-up, method 600 moves on to step 604. At step 604, one or more multi-source audio signals may be received from the microphone array. For example, time-domain samples of the multi-source audio signals 402 in FIG. 4 may be received via the audio input circuitry 315 in FIG. 3.

At step 606, the one or more multi-source audio signals may be transformed from time-domain to time-frequency representations. For example, the subband analysis module 405 may transform the time-domain signals to time-frequency domain representations, as described in relation to FIG. 4.

At step 608, TDOA detection data may be computed for the one or more multi-source audio signals according to a STMV beamformer based on the computed TDOA locus. For example, for each microphone pair, a covariance matrix may be computed using time-frequency representations of the one or more multi-source audio signals from the respective microphone pair for every frequency band, e.g., according to Eq. (2) described in relation to FIG. 4. A steering matrix may then be constructed for every frequency band based on TDOA locations for different scans of azimuth and elevation angles corresponding to the respective microphone pair, e.g., according to Eq. (3) described in relation to FIG. 4. A directional covariance matrix may be constructed aligned across all frequency band based on the constructed steering matrix and the computed covariance matrix, e.g., according to Eq. (4) described in relation to FIG. 4. A pseudo-likelihood solution that minimizes a beam power may be determined based on the constructed directional covariance matrix, e.g., according to Eq. (5) described in relation to FIG. 4. A STMV joint pseudo-likelihood may then be computed by taking a product of all determined pseudo-likelihood solutions across all microphone pairs, e.g., according to Eq. (6) described in relation to FIG. 4. A pair of azimuth and elevation angles that maximizes the STMV joint pseudo-likelihood may then be determined, e.g., according to Eq. (7) described in relation to FIG. 4. The determined pair of azimuth and elevation angles may then be transformed to a polar representation that represents the TDOA detection data, e.g., according to Eq. (8) described in relation to FIG. 4.

At step 610, a plurality of audio tracks may be updated and VAD data may be constructed based on the computed TDOA detection data up to a current time-step. For example, the TDOA detection corresponding to a current time-step and a set of existing audio tracks that have been previously established till the current time-step may be identified. Method 600 may then determine whether to incorporate the TDOA detection into one of the existing audio tracks or establishing a new audio track based on a comparison between the TDOA detection and gates of the existing audio tracks, as described in relation to module 430 in FIG. 4. For another example, method 600 may assign a first value to the VAD of a respective audio track when the respective audio track is closest to the TDOA detection and assign a second value to VADs of other audio tracks, as described in relation to module 430 in FIG. 4.

At step 612, one or more enhanced multi-source audio signals may be generated using the updated plurality of audio tracks and the constructed VAD data. For example, the enhanced multi-source audio signals may then be transmitted to various devices or components. For another example, the enhanced multi-source audio signals may be packetized and transmitted over a network to another audio output device (e.g., a smart phone, a computer, etc.). The enhanced multi-source audio signals may also be transmitted to a voice processing circuitry such as an automated speech recognition component for further processing.

The foregoing disclosure is not intended to limit the present invention to the precise forms or particular fields of use disclosed. As such, it is contemplated that various alternate embodiments and/or modifications to the present disclosure, whether explicitly described or implied herein, are possible in light of the disclosure. For example, embodiments described herein may be used to provide the position of multiple sound sources in the environment in order to supervise human-machine interaction tasks, e.g., in applications incorporating additional information from other modalities such as video streams, 3D cameras, Lidars, etc. Having thus described embodiments of the present disclosure, persons of ordinary skill in the art will recognize advantages over conventional approaches and that changes may be made in form and detail without departing from the scope of the present disclosure. Thus, the present disclosure is limited only by the claims.

What is claimed is:

1. A method for enhancing multi-source audio by multi-source tracking and voice activity detection, comprising:
   receiving, via audio input circuitry, one or more multi-source audio signals from a microphone array;
   computing time difference of arrival (TDOA) detection data for the one or more multi-source audio signals according to a steered minimum variance (STMV) beamformer based on TDOA locus information constructed in a multi-dimensional space defined by a number of microphone pairs from the microphone array;
   updating a plurality of audio tracks based on the computed TDOA detection data up to a current time-step by incorporating a TDOA detection into an existing audio track or establishing a new audio track depending on a comparison between the TDOA detection and gates of the existing audio track;
   constructing voice activity detection (VAD) data for each of the plurality of audio track based on the computed TDOA detection data; and
   generating one or more enhanced multi-source audio signals using the updated plurality of audio tracks and the constructed VAD data.

2. The method of claim 1, wherein the multi-dimensional space defined by a number of microphone pairs from the microphone array is formed by:
   selecting a first microphone from the microphone array as a reference microphone; and
   pairing each remaining microphone from the microphone array with the reference microphone.

3. The method of claim 2, wherein the TDOA locus information is computed once at a boot-up stage based on spatial information of the number of microphone pairs by:
   for each microphone pair, computing a TDOA location corresponding to a specific azimuth angle and a specific elevation angle of an incident ray based on a distance and an angle between two microphones in the respective pair; and
   forming a mesh of TDOA location points by varying the specific azimuth angle and the specific elevation angle of the incident ray over all microphone pairs.

4. The method of claim 3, wherein the mesh of TDOA location points are located on a first plane in the multi-dimensional space having a number of dimensions equal to a total number of microphone pairs, when the microphone array physically lie on a second plane in reality.

5. The method of claim 2, wherein the computing TDOA detection data for the one or more multi-source audio signals further comprises:
   for each microphone pair:
      computing a covariance matrix using time-frequency representations of the one or more multi-source audio signals from the respective microphone pair for every frequency band;
      constructing a steering matrix for every frequency band based on TDOA locations for different scans of azimuth and elevation angles corresponding to the respective microphone pair;
      constructing a directional covariance matrix aligned across all frequency band based on the constructed steering matrix and the computed covariance matrix; and
      determining a pseudo-likelihood solution that minimizes a beam power based on the constructed directional covariance matrix.

6. The method of claim 5, further comprising:
   computing a STMV joint pseudo-likelihood by taking a product of all determined pseudo-likelihood solutions across all microphone pairs;
   determining a pair of azimuth and elevation angles that maximizes the STMV joint pseudo-likelihood; and
   converting the determined pair of azimuth and elevation angles to a polar representation that represents the TDOA detection data.

7. The method of claim 6, wherein the constructing the directional covariance matrix aligned across all frequency band based on the constructed steering matrix and the computed covariance matrix is repeated over all microphone pairs and all scans of azimuth and elevation angles.

8. The method of claim 6, wherein the constructing the directional covariance matrix aligned across all frequency band based on the constructed steering matrix and the computed covariance matrix is performed with reduced repetitions by:
   dividing the multi-dimensional space into a number of segments, wherein the number of segments is less than a total number of dimensions of the multi-dimensional space;
   mapping each TDOA location point from a mesh of TDOA location points to a closest segment; and
   computing the directional covariance matrix using the number of segments and a mapping relationship between the mesh of TDOA location points and the number of segments instead of the mesh of TDOA location points built from all scans of azimuth and elevation angles.

9. The method of claim 1, wherein the updating the plurality of audio tracks based on the computed TDOA detection data up to the current time-step further comprises:
   identifying the TDOA detection corresponding to a current time-step and a set of existing audio tracks that have been previously established till the current time-step.

10. The method of claim 1, wherein the constructing VAD data for each of the plurality of audio tracks based on the computed TDOA detection data further comprises:
    assigning a first value to a respective audio track when the respective audio track is closest to the TDOA detection; and
    assigning a second value to other audio tracks.

11. An audio processing device for enhancing multi-source audio by multi-source tracking and voice activity detection, comprising:
    audio input circuitry configured to receive one or more multi-source audio signals from a microphone array;

a time difference of arrival (TDOA) estimator configured to compute TDOA detection data for the one or more multi-source audio signals according to a steered minimum variance (STMV) beamformer based on TDOA locus information constructed in a multi-dimensional space defined by a number of microphone pairs from the microphone array;

a multi-source audio tracker configured to
update a plurality of audio tracks based on the computed TDOA detection data up to a current time-step by incorporating a TDOA detection into an existing audio track or establishing a new audio track depending on a comparison between the TDOA detection and gates of the existing audio track; and construct voice activity detection (VAD) data for each of the plurality of audio track based on the computed TDOA detection; and an audio enhancement engine configured to generate one or more enhanced multi-source audio signals using the updated plurality of audio tracks and the constructed VAD data.

12. The audio processing device of claim 11, wherein the multi-dimensional space defined by a number of microphone pairs from the microphone array is formed by:
selecting a first microphone from the microphone array as a reference microphone; and
pairing each remaining microphone from the microphone array with the reference microphone.

13. The audio processing device of claim 12, wherein the TDOA locus information is computed once at a boot-up stage based on spatial information of the number of microphone pairs by:
for each microphone pair, computing a TDOA location corresponding to a specific azimuth angle and a specific elevation angle of an incident ray based on a distance and an angle between two microphones in the respective pair; and
forming a mesh of TDOA location points by varying the specific azimuth angle and the specific elevation angle of the incident ray over all microphone pairs.

14. The audio processing device of claim 13, wherein the mesh of TDOA location points are located on a first plane in the multi-dimensional space having a number of dimensions equal to a total number of microphone pairs, when the microphone array physically lie on a second plane in reality.

15. The audio processing device of claim 12, wherein the TDOA estimator is configured to compute the TDOA detection data by:
for each microphone pair:
computing a covariance matrix using time-frequency representations of the one or more multi-source audio signals from the respective microphone pair for every frequency band;
constructing a steering matrix for every frequency band based on TDOA locations for different scans of azimuth and elevation angles corresponding to the respective microphone pair;
constructing a directional covariance matrix aligned across all frequency band based on the constructed steering matrix and the computed covariance matrix; and
determining a pseudo-likelihood solution that minimizes a beam power based on the constructed directional covariance matrix.

16. The audio processing device of claim 15, wherein the TDOA estimator is further configured to compute the TDOA detection data by:
computing a STMV joint pseudo-likelihood by taking a product of all determined pseudo-likelihood solutions across all microphone pairs;
determining a pair of azimuth and elevation angles that maximizes the STMV joint pseudo-likelihood; and
converting the determined pair of azimuth and elevation angles to a polar representation that represents the TDOA detection data.

17. The audio processing device of claim 16, wherein the TDOA estimator is further configured to repeat over all microphone pairs and all scans of azimuth and elevation angles to construct the directional covariance matrix aligned across all frequency band based on the constructed steering matrix.

18. The audio processing device of claim 16, wherein the TDOA estimator is further configured to construct the directional covariance matrix aligned across all frequency band based on the constructed steering matrix and the computed covariance matrix with reduced repetitions by:
dividing the multi-dimensional space into a number of segments, wherein the number of segments is less than a total number of dimensions of the multi-dimensional space;
mapping each TDOA location point from the mesh of TDOA location points to a closest segment; and
computing the directional covariance matrix using the number of segments and a mapping relationship between the mesh of TDOA location points and the number of segments instead of the mesh of TDOA location points built from all scans of azimuth and elevation angles.

19. The audio processing device of claim 11, wherein the multi-source audio tracker is configured to update the plurality of audio tracks based on the computed TDOA detection data up to the current time-step by:
identifying the TDOA detection corresponding to a current time-step and a set of existing audio tracks that have been previously established till the current time-step.

20. The audio processing device of claim 11, wherein the multi-source audio tracker is configured to construct VAD data for each of the plurality of audio tracks based on the computed TDOA detection by:
assigning a first value to a respective audio track when the respective audio track is closest to the TDOA detection; and
assigning a second value to other audio tracks.

* * * * *